United States Patent [19]
Domergue et al.

[11] Patent Number: 5,728,354
[45] Date of Patent: Mar. 17, 1998

[54] PROCESS AND PLANT FOR GENERATING NITROGEN FOR HEAT TREATMENT

[75] Inventors: Didier Domergue, Bagneux; Yannick Rancon, Velizy, both of France

[73] Assignee: L'Air Liquide Societe Anonyme pour l'Etude et l'Exploitation des Procedes Georges Claude, Paris, France

[21] Appl. No.: 659,688

[22] Filed: Jun. 6, 1996

Related U.S. Application Data

[62] Division of Ser. No. 478,393, Jun. 7, 1995.

[30] Foreign Application Priority Data

Mar. 16, 1995 [FR] France ............................ 95 03050

[51] Int. Cl.$^6$ ............................................. B01D 50/00
[52] U.S. Cl. .......................... 422/177; 422/171; 422/172; 422/173; 422/190; 422/200
[58] Field of Search .................................. 422/171, 170, 422/172, 173, 177, 190, 200, 168; 423/351, 359, 387, 362, 363

[56] References Cited

U.S. PATENT DOCUMENTS

| | | |
|---|---|---|
| 3,535,074 | 10/1970 | Nakashima . |
| 4,505,879 | 3/1985 | Lhonoré et al. ............... 422/197 |
| 4,632,678 | 12/1986 | Cosyns et al. .................. 422/223 |
| 4,988,490 | 1/1991 | Nicholas et al. ............... 423/351 |
| 5,073,350 | 12/1991 | Ham et al. ..................... 422/190 |

FOREIGN PATENT DOCUMENTS

| | | |
|---|---|---|
| 595 181 | 5/1994 | European Pat. Off. . |
| 603 767 | 6/1994 | European Pat. Off. . |
| 2639251 | 5/1990 | France . |
| 2 160 439 | 12/1985 | United Kingdom . |

OTHER PUBLICATIONS

Chemical Abstracts, vol. 107, No. 20, Nov. 16, 1987, Abstract No. 179402k, D. Cheng et al., "Equipment and Process for Producing Superpure Nitrogen From Common Nitrogen", p. 202.

*Primary Examiner*—Hien Tran
*Attorney, Agent, or Firm*—Burns, Doane, Swecker & Mathis, LLP

[57] ABSTRACT

A plant for generating a nitrogen-based gas is provided. The plant includes a source of impure nitrogen under pressure containing a residual oxygen concentration; a main gas conduit; a catalytic deoxygenation reactor; a secondary gas line connected to a source of a secondary reducing gas at one end thereof and to the main gas conduit at a point situated upstream of the catalytic deoxygenation reactor at another end thereof; and a device for removing water vapor present in a gas. The source of impure nitrogen is connected to the catalytic deoxygenation reactor via the main gas conduit. The main gas conduit between the source of impure nitrogen and the point where the secondary gas line is connected is devoid of any flow control device.

8 Claims, 5 Drawing Sheets

PROCESS AND PLANT FOR GENERATING NITROGEN FOR HEAT TREATMENT

This application is a divisional of application Ser. No. 08/478,393, filed Jun. 7, 1995.

BACKGROUND OF THE INVENTION (i) Field of the Invention

The present invention relates to the field of the atmospheres employed in heat treatment furnaces.

(ii) Description of Related Art

In most cases atmospheres employed in heat treatment furnaces contain a predominant species which is generally nitrogen supplemented, if appropriate, depending on the type of heat treatment practiced and the nature of the material treated, by more or less active additional species such as $H_2$, CO, $H_2O$, $CO_2$ or hydrocarbons.

The nitrogen employed in such heat treatment atmospheres is most commonly of cryogenic origin. Its purity is then excellent (such a nitrogen typically contains less than 5 ppm of residual oxygen and less than 5 ppm of residual water vapor, corresponding to a dew point lower than $-65°$ C.) and is suitable in practice for virtually all the types of heat treatment.

In recent years there has been considerable development in the production of nitrogen by means such as membranes (the expression "membrane module" is also frequently employed) or a preferential adsorption module, in both cases frequently called "means on site" or "onsite", supplementing the conventional production by a cryogenic route, because these means of on-site production present the following advantages:

an excellent safety of supply;

low production costs;

the possibility of supplying, at very attractive costs and depending on the applications considered, nitrogens of adapted purity, often referred to as "impure nitrogens", insofar as the residual oxygen concentration in these nitrogens can vary from a few thousand ppm to a few per cent.

Nevertheless, if the example of nitrogen produced by permeation is considered, its lower cost is linked with an oxygen and water vapor purity that is appreciably less satisfactory than that obtained by a cryogenic route (typically 0.5% to 5% of residual oxygen and less than 10 ppm of water vapor), it being known that the higher the quantity of residual oxygen which is tolerated the lower will be the cost and, conversely, the smaller the quantity of residual oxygen which is tolerated the higher will be the cost of such a membrane nitrogen, thus bringing it close to the costs attained by a cryogenic route.

The presence of residual oxygen in these impure nitrogens makes it difficult to use them in heat treatment atmospheres.

An attempt may be made, in a first step, to adapt the purity of the nitrogen produced to the specification of each user site: wherein metals in question which are not readily oxidizable are considered to be less sensitive to the presence of oxidizing species in the atmosphere, whereas other metals being treated will be more sensitive to the presence of oxygen. Alternatively, the appearance of the metal surface which is being sought might require an atmosphere of lower oxidizing power than in the case of another surface appearance which is being sought. It would therefore be possible to distinguish the following two cases:

cases where the specification of the user site is compatible with the presence of oxygen (for example higher than 0.5%) in the treatment atmosphere. It must be said, however, that such a specification is rarely encountered in practice. Nevertheless, it is possible to mention in this category the case of the annealing of pig irons with a certain tolerance of decarburizing to approximately 0.3 mm;

the case where the specification of the user site is not compatible with the presence of free oxygen in the treatment atmosphere, these cases representing the huge majority of the heat treatments in industrial practice. It is then absolutely necessary to lower the residual oxygen content in the treatment atmosphere to less than 20 ppm.

From this it is therefore concluded that the use of impure nitrogen (obtained by a noncryogenic route) requires unquestionably, and in virtually all of the cases in industrial practice, a deoxygenation of this impure nitrogen before any contact of the atmosphere with the articles to be treated.

The methods envisaged in the literature to find a solution to this problem of deoxygenation of the nitrogen can be grouped into two categories: deoxygenation in situ or deoxygenation ex situ.

In the first case the nitrogen which contains the residual oxygen is injected as is into the furnace, together with one or several other gaseous species which will act as oxygen-scavengers (also referred to in most cases as a "getter"), by virtue of their reducing properties.

These are, for example, $H_2$, CO, $SiH_4$, hydrocarbons CxHy capable of scavenging oxygen in a furnace environment or else methanol $CH_3OH$ (which itself first decomposes to CO and $H_2$).

The "getter" will then react inside the heat vessel, at a given temperature, with the free oxygen to be removed, to form, depending on the case, water vapor, CO, hydrogen, $CO_2$ or a number of these components.

These processes for in situ deoxygenation are known and form the subject of an abundant literature; nevertheless, they exhibit the following disadvantages:

such a thermal decomposition in situ is to a large extent a function of the temperature of the treatment vessel. Consequently, if the treatment temperature is too low or else if the mixture of nitrogen+oxygen+"getter" is injected into too cold a part of the heat vessel, the deoxygenation reaction will be incomplete, allowing residual oxygen to come into contact with the articles to be treated;

according to these processes the quantity of residual oxygen initially present in the noncryogenic nitrogen to be purified is generally and deliberately kept lower than 0.5% or else 1% by volume, this being in order to make it certain that a virtually complete deoxygenation (lower than 20 ppm $O_2$) will take place before the atmosphere comes into contact with the metal articles to be treated. In this case preference will therefore be given to impure nitrogens in which the residual oxygen concentration is relatively low, entailing a proportionally high production cost;

it must also be noted that such a deoxygenation reaction results in the creation of oxidizing species such as $CO_2$ and $H_2O$, undoubtedly less oxidizing than oxygen, but the oxidizing and decarburizing nature of which may be clearly incompatible with the specification of numerous heat treatments which are practiced.

In this category of treatments which are compatible with an in-situ deoxygenation there may be mentioned the classical case of processes for carburizing of carbon steels employing nitrogen/methanol atmospheres, where the creation of oxidizing species CO2 and $H_2O$ is to a large extent compensated by the presence of the reducing species $H_2$ and CO and by the possible control of $CO/O_2$ and $H_2/H_2O$ ratios by additions of hydrocarbon(s).

The second category of methods, known as ex situ, use a premix of impure nitrogen (which can in this case easily contain more than 0.5% of residual oxygen) with the getter, the mixture reacting in a catalytic deoxygenation reactor placed outside the heat treatment vessel.

The key point of these methods is therefore that the deoxygenation reaction takes place before the introduction of the gaseous mixture into the heat treatment vessel and therefore before the atmosphere comes into contact with the metal components to be treated.

The oxygen/getter combination is not spontaneous in this case; it is performed on a catalyst, typically palladium/alumina or else platinum/alumina.

The nitrogen leaving the deoxygenation reactor is then substantially devoid of residual oxygen (less than 20 ppm by volume) and, as previously, contains species of the $CO_2$, $H_2O$, CO, $H_2$ and $CH_4$ type (depending on the getter employed).

The Applicant Company had proposed, in document EP-A-370,872, a process forming part of this category, combining impure nitrogen with hydrogen on a palladium catalyst. While such a process is of great simplicity in use, the atmosphere produced is free from oxygen but still contains water vapor and is therefore suitable for a limited number of heat treatments (it is suitable, for example for the treatment of copper but not for the treatment of steels).

It is true that in this precise case of a hydrogen getter, where water vapor is formed in the gas produced, it is possible to perform a subsequent purification of this gas, based on adsorption on molecular sieve. These processes of catalytic deoxygenation followed by purification by adsorption are commonly listed in the literature under the name of "deoxo". They make it possible to obtain nitrogen whose purity is very close to that produced by a cryogenic route, typically $O_2$ lower than 10 ppm, $H_2O$ lower than 10 ppm (dew point lower than $-60°$ C.) and, where appropriate, a very small residue of hydrogen.

The nitrogen produced by such a system is therefore of a very high quality which is suitable, of course, for all the types of heat treatments practiced in industry, but which is obtained at the price of a piece of relatively complex and costly "deoxo" equipment. This cost aspect is to a large extent linked with the need to employ a part of the nitrogen produced by the device for regenerating the adsorbent between 15 and 30% of the nitrogen produced).

Still in this category of deoxygenation ex situ, the Applicant company had proposed, in document EP-A-482,992, the use of a reaction of impure nitrogen+hydrocarbon in a platinum catalyst reactor with external heat input.

Such a process gives rise to a very low atmosphere cost, owing to the fact that it makes it possible to employ impure nitrogen containing a relatively high proportion of residual oxygen (for example between 3 and 5% by volume) and that it employs a hydrocarbon "getter" (for example natural gas).

It must also be noted that the atmosphere thus produced is virtually free from oxygen (residual oxygen concentration in all cases lower than 20 ppm by volume) and additionally contains reducing and carburizing species such as $H_2$ and CO which are very useful in heat treatment, making it possible to control the $H_2/H_2O$ and $CO/CO_2$ ratios and therefore the oxidizing or reducing potential of each atmosphere.

Such a process still represents a certain complexity of implementation (need for an external heat input, reaction at relatively high temperature), which makes it relatively inappropriate in the case where low flow rates (of only a few tens of $m^3/h$) need to be installed.

From these comments it can therefore be concluded that ex-situ deoxygenation processes exhibit undoubted advantages: a deoxygenation reaction temperature which is easily controllable independently of the temperature of the heat vessel, or else the fact that the quantity of residual oxygen present initially in the impure nitrogen to be treated does not constitute a limitation, insofar as the reaction is complete before the atmosphere comes into contact with the articles. The deoxygenation action thus conducted undoubtedly gives rise to the formation of oxidizing species such as $H_2O$ and $CO_2$, but it is then possible to perform an after-purification before the atmosphere reaches the heat treatment vessel, even if this purification turns out to be very costly in practice.

The Applicant Company had furthermore proposed, in document FR-A-2,639,251, a process of the above mentioned type (noncryogenic impure nitrogen deoxygenated by a catalytic route), where the stage of purification from water vapor was performed by condensation (exchange of the gas with a cold fluid resulting in the condensation of the water vapor present in the gas, followed by a stage of purification of the liquid phase thus created by passing through a refrigeration unit or else through a membrane). This document mentioned the possibility of working under pressure, both with regard to the catalytic reactor and during the purification stage.

SUMMARY AND OBJECTS OF THE INVENTION

In this context the objective of the present invention is to propose an improved process for producing nitrogen by a noncryogenic route, using a stage of deoxygenation of this nitrogen and of purification from the reaction products (essentially $H_2O$ but also, where appropriate, $CO_2$, CO etc.), and the performance of which makes it possible to improve the purification stage, while attaining a sufficient flexibility to produce the atmosphere simply compatible with the specification of the heat treatment in question (cost/performance compromise, avoiding excess quality and hence cost).

The work which the Applicant Company has continued on this subject has demonstrated that it is necessary to perfect the idea developed in FR-A-2,639,251, of an operation under pressure, to propose a process for generating nitrogen by a noncryogenic route offering an answer to the above mentioned technical problems of flexibility and adaptability to the specification in question, of excellent cost/performance compromise, or of simplicity in use, by the combined application of the following measures:

using water vapor extraction stages based on condensation and carrying out both the actual catalytic reaction and the stages of purification from water vapor under significant pressure (preferably above $5 \times 10^5$ Pa);

bearing in mind these pressure conditions, feeding impure nitrogen at the point where the reaction mixture of impure nitrogen/reducing gas (hydrogen or hydrocarbon) is produced according to an uncontrolled all-or-nothing method;

still in connection with the pressure conditions practiced, advantageously placing the buffer capacity, which traditionally serves as a lung in such a process, only downstream of the point already referred to, where the reaction mixture of impure nitrogen/reducing gas is produced, and preferably downstream of the purification stage or else upstream of the catalytic reactor;

the gas then being under pressure, depending on the configuration adopted as far as and including the buffer capacity, or else as far and including the stage of purification from water vapor, the pressure release stage (to obtain an output gas at a utilization pressure close to atmospheric pressure) is performed only downstream of this buffer capacity or of the purification stage in question.

In fact, as expounded further in the context of examples, the work under pressure (if possible combined with the use of a sufficiently low temperature, for example 3° C., for the condensation) enables the yield of the stage of purification from water vapor to be appreciably increased and controlled, and also the working volume of catalyst to be decreased.

It therefore appears important to take advantage of the pressure available at the exit of the generator of impure nitrogen (a pressure reserve which is not very high), but also, and above all, to avoid any pressure drop in the plant.

Such a limitation of the pressure drops in the plant (and therefore of the presence in the line of means which could cause pressure drops) appears relatively incompatible with two characteristics of such deoxygenation processes:

on the other hand, it is necessary to control accurately the ratio of oxygen/hydrogen or else oxygen/hydrocarbon concentrations in the mixture reacting in the reactor (to avoid the untimely presence of residual oxygen at the reactor exit);

on the other hand, account must be taken of the fact that the generators producing impure nitrogen (air separators) traditionally operate in successive stages of stoppage (0 m³/h, generator stopped) and of production (nominal flow rate X m³/h, generator in service) whereas, on the other hand, the user station at the end of the line will be just as capable of operating continuously as of varying its flow rate in this range 0–X m³/h, potentially entailing a variation in the reaction conditions at the catalytic reactor.

The succession of stages in the process according to the invention makes it possible precisely to considerably limit the pressure drops in the plant while being compatible with the operating conditions referred to above, giving rise, in extremely favorable cost conditions, to an excellent water vapor extraction efficiency, an efficiency which can be adapted according to the operating conditions practiced, to remain as close as possible to the real specifications of the user's specification, thus giving rise to the production of a nitrogen almost completely devoid of oxygen (lower than 20 ppm by volume) and relatively devoid of water vapor (depending on the conditions practiced: less than 1000 ppm of residual water vapor, corresponding to a dew point lower than −20° C. or else, if necessary, less than 700 ppm of residual water vapor, corresponding to a dew point lower than −25° C. if the treatment conditions so demand).

In a first aspect, the present invention relates to a process for generating a nitrogen-based gas, comprising the steps of:

(i) combining a secondary reducing gas including at least one reducing gas with a primary nitrogen gas including 0.5–5% by volume of oxygen, the combining of the secondary gas being performed according to an uncontrolled all-or-nothing method;

(ii) reacting the primary gas and the secondary gas in a catalytic deoxygenation reactor so as to obtain a nitrogen-based reaction gas which includes water vapor; and (iii) removing at least a part of the water vapor present in the nitrogen-based reaction gas by cooling the reaction gas under pressure to induce formation of a liquid phase and then extracting the liquid phase from the reaction gas under pressure to obtain a purified reaction gas.

In a second aspect, the present invention relates to a process for generating a nitrogen-based gas, comprising the steps of:

(i) producing a nitrogen primary gas which includes a residual oxygen content in an air separator by adsorption or permeation;

(ii) directing said primary gas along a main conduit towards a catalytic deoxygenation reactor;

(iii) adding a secondary reducing gas including at least one reducing gas to the primary gas at a point in said main conduit before it reaches the reactor, the addition of said secondary gas being performed according to an uncontrolled all-or-nothing method;

(iv) reacting the primary gas and the secondary gas in the catalytic reactor so as to obtain a nitrogen-based reaction gas which includes water vapor;

(v) removing at least a part of the water vapor present in the nitrogen-based reaction gas by cooling the reaction gas under pressure to induce formation of a liquid phase and then extracting the liquid phase from the reaction gas under pressure to obtain a purified reaction gas.

In yet another aspect, the present invention relates to a plant for generating a nitrogen-based gas including in succession along a main gas conduit:

(i) a source of impure nitrogen under pressure containing a residual oxygen concentration;

(ii) a catalytic deoxygenation reactor;

(iii) a device for removing at least part of the water vapor present in a gas, including at least one means for cooling a gas and at least one means for extracting at least part of the liquid water phase present in a gas;

and (iv) a secondary gas line connected in its upstream part to a source of a secondary reducing gas and, in its downstream part, to the main conduit, at a point situated upstream of the catalytic reactor, wherein the part of the main conduit situated upstream of the point of the main conduit where the secondary gas line is connected and downstream of the source of impure nitrogen is devoid of any flow control device.

With the foregoing as well as other objects, advantages and features of the invention will be hereinafter apparent, the nature of the invention will be better understood by reference to the following detailed description of the preferred embodiments, the appended claims and the drawings.

DETAILED DESCRIPTION OF PREFERRED EMBODIMENTS

An "uncontrolled all-or-nothing" method according to the invention is understood to mean a method where the point of the main conduit where the addition is performed is fed with primary gas in a binary manner: 0 m³/h when it is not fed, X m³/h when the point receives primary gas, X denoting the nominal flow rate of the separator, the part of main conduit situated upstream of this point and downstream of the separator being devoid of any flow control device.

A flow "control" device is to be understood according to the invention to be any instrument which limits (for example a throttling valve, a calibrated orifice etc.) or regulates a gas flow (for example a proportional valve, a mass flow controller etc.).

The operation under pressure according to the invention is therefore to be understood as being at a pressure that is higher than atmospheric pressure; depending on the results sought after (specification), the working pressure will advantageously be at least $2\times10^5$ Pa absolute, preferably in the range [$5\times10^5$ Pa, $15\times10^5$ Pa].

Similarly, and depending on the case in question (performance sought after, local costs of energy and of the reducing gas) a source of impure nitrogen will be preferably employed in which the residual oxygen content is lower than or equal to 5% by volume, more preferably between 0.1% and 3% and, still more preferably, between 0.5 and 2%.

According to one of the embodiments of the invention the purified reaction gas obtained at the exit of the purification stage is directed to and stored in a buffer capacity from which it is withdrawn depending on the requirements of the final user station. This gas is then advantageously expanded (in one or more operations) to a pressure $P_f$ of use of the gas by the user station (for example a furnace). This pressure $P_f$ will therefore generally be close to atmospheric pressure (which according to the invention is to be understood as a pressure $P_f$ lying in the region between approximately $1\times10^5$ Pa and $2\times10^5$ Pa absolute). It will therefore be noted that in this configuration the gas line is under pressure as far as and including the buffer capacity.

According to another embodiment of the invention a buffer capacity is arranged upstream of the catalytic reactor but downstream of the point, already mentioned, of the main conduit where the addition of secondary gas is performed. The expansion stage will therefore be performed in this case directly on leaving the purification stage. It will therefore be noted that in this configuration the gas line is under pressure up to and including the purification stage.

As already stated, the process according to the invention is based on the use of a significant pressure throughout an upstream part of the process and on the achievement of a minimum pressure drop between the upstream source of gas and the point in the line where the purification stage is performed.

To this end the addition of secondary gas into the main conduit, in order to produce the mixture of impure gas/secondary gas which is to react in the catalytic reactor will advantageously take place by "direct" injection of the secondary gas into the main conduit.

"The direct injection" according to the invention is therefore to be understood as not involving any "significant" mixing device that would be a source of pressure drop; such an injection will therefore be carried out, for example, with the aid of a secondary conduit connected in its upstream part to a source of secondary gas including the reducing gas and, in its downstream part, to the main conduit.

With the same concern for avoiding the upstream presence of any device capable of inducing a pressure drop, it will be noted that the buffer capacity which traditionally represents the "lung" of such processes for producing nitrogen on site is preferably placed cleverly downstream of the point where the addition is performed, preferably downstream of the stage of purification from water vapor, or else between the point of addition and the catalytic reaction. As already mentioned above, it must be considered, in fact, that the generators for producing impure nitrogen (be it by permeation or adsorption) traditionally operate in a stage-alternation regime: 0 m³/h (generator stopped) or X m³/h (generator in service at its nominal flow rate). However, on the other hand, the user station at any line end operates continuously (outside its stoppage periods) and can vary its flow rate within this range.

A buffer capacity placed (as is traditionally the case in such on-site nitrogen generators) just at the exit of the air separator, is then accompanied by means for measuring and controlling (regulating) the flow rate of nitrogen injected into the mixture, so as to maintain continually the desired proportion of $O_2$/reducing gas, whereas the process according to the invention seeks precisely to limit the presence of such control devices, which constitute powerful sources of pressure drops. In fact, the user station drawing a variable flow from this buffer capacity placed upstream of the point of mixing will also vary the proportion of impure nitrogen reaching the reactor. It is true that, in the case of such a traditional buffer capacity configuration, it would be possible to conceive a simple measurement of the nitrogen flow rate in the main conduit just behind the buffer capacity, without any means of regulation, and a feedback, from this flow rate measurement, to the secondary route for reducing gas, where, on the other hand, means for measuring and regulating the flow rate of secondary gas would be arranged.

This solution, while capable of being envisaged from a conceptual viewpoint (since a simple means of measurement could introduce a relatively acceptable pressure drop compatible with operation under pressure), is clearly less advantageous from the economic point of view, owing to the regulation which it imposes, and also owing to the necessary management of the safety aspect to which it gives rise (especially in the reducing gas route).

The succession of stages of the process according to the invention offers a solution which takes advantage of the fact that such separators can be employed as "flow generators".

More precisely, both the proposed buffer capacity configurations offer the advantage that the gas flow which passes through the catalytic reactor is of constant oxygen and reducing gas composition, (as fixed by the operating parameters of the separator, including its nominal flow rate, and by the fixed flow rate of secondary gas arriving in the main conduit).

On the other hand, they differ on the following points:

the "upstream capacity" (upstream of the reactor) configuration makes it possible very advantageously to ensure that the flow which passes through the catalytic reactor is steady (it corresponds, in fact, to the flow rate which the user draws at the end of the line), whereas in the case of the "downstream capacity" configuration the reactor receives a nitrogen/reducing gas flow which follows the stage alternations of the separator;

in addition, the "upstream" configuration allows the buffer capacity to be arranged outside (whereas, for climatic reasons, the catalytic reactor and means employed for the extraction are preferably placed inside), and this entails, on the one hand, a significant saving in space, and, above all, offers advantages that are not insignificant in terms of safety. In fact, the buffer capacity placed outside makes it possible to avoid having a line carrying the reducing gas (potentially very pure) running inside the plant shop, especially near various electrical cabinets forming part of the plant.

As will therefore be clearly apparent to a person skilled in the art on sight of this description, the position chosen for placing the buffer capacity will depend especially on local factors (site configuration) and the specification sought after, resulting in handling of more or less high concentrations of combustible gas ($H_2$, CxHy, etc.), and therefore more or less problematic where safety is concerned.

The first stage of cooling according to the process is carried out so as to perform a cooling of the gas originating from the catalytic reactor (which generally leaves it at a temperature which is not insignificant, for example close to 150° C. in the case of a nitrogen containing 1% of residual oxygen), if possible at a temperature lower than 50° C., to condense the water vapor present in the gas before it is extracted, for example by settling.

This first stage of cooling of the reaction gas may, for example, be performed by exchange with a cold fluid, for example in a gas/gas exchanger (by way of example of embodiment it would be possible in this case to employ an air cooler of the type with natural or forced convection, which is very cheap, and which, because of the work at pressure, offers a greatly improved exchange coefficient), or else a gas/liquid exchanger (for example by passing the gas through a water exchanger which may advantageously consist of a copper or stainless steel loop immersed in a water trough) or else a gas/coolant fluid exchanger (which involves, for example, a cryogenic liquid or a Freon).

One of the stages of cooling may advantageously be carried out by passing the reaction gas through one of the routes of a plate exchanger. In such a configuration it will then be advantageous to pass through the other route of the plate exchanger the already purified reaction gas produced in the purification stage, which has negative calories to be released.

In fact, as will be clearly apparent to a person skilled in the art seeing this description, it will be possible, within the scope of the invention, to produce, depending on the requirements, many suitable combinations of cooling and extraction stages, for example, and purely by way of illustration, many successively cooling/extraction combinations or else many cooling stages producing plateaus followed by a single extraction stage, or else, after the carrying out of at least one cooling stage followed by an extraction stage, the application of at least one other cooling/extraction combination etc. The choice of the succession of stages used and of the constitution of each stage will depend, understandably, on the performance values which it is desired to attain. By way of illustration, the conditions to be attained in the case of steel annealing will be more draconian than in the case of copper annealing, where, as is known, water vapor can be tolerated more widely.

Since an on-site impure nitrogen generator operates in most cases in successive production and stoppage stages, it therefore appear very advantageous to couple the stages of start-up (and therefore operation) of the separator and of entry of the secondary gas into the main conduit, so as to avoid any safety problem linked with the use of the reducing gas. The necessary means (for example a servo valve present in the secondary conduit for secondary gas) will be utilized for this purpose, allowing secondary gas to be allowed to enter the main circuit only if the separator is in a production stage (thus preventing hydrogen or a hydrocarbon being delivered potentially pure into the heat treatment furnace without having been combined with oxygen).

It will also be noted that, in order to meet the objective of limitation of pressure drops upstream of the point where the purification stage is performed, a flow control device upstream of the point of addition is optionally tolerated only in the secondary line for delivering secondary gas. The presence of such devices in this secondary line entails few unfavorable consequences in terms of pressure drop since, in most cases, a large pressure reserve will be available in this line (for example $200 \times 10^5$ Pa in a hydrogen cylinder), which is not the case in the main conduit connected to the on-site separator.

Nevertheless, a calibrated orifice will be advantageously employed in the secondary conduit, for cost reasons.

As will be also clearly apparent to a person skilled in the art, depending on the atmosphere sought after, the reducing gas employed, depending on the circumstances, will be hydrogen or else a hydrocarbon (be it a compound formula CxHy or else an alcohol). The reaction gas obtained at the reactor exit will then have a quite different composition ($N_2+H_2O$+optionally a hydrogen residue in one case, a much more complex atmosphere in other cases, including $N_2$, $H_2O$, but also more or less hydrogen, CO, $CO_2$ or else a hydrocarbon residue etc.).

In this latter case, and depending on the destination of the atmosphere, attention will then be given to performing, at a point of the main conduit situated downstream of the catalytic reactor, at least one additional operation of purification from at least one of the gases from the group consisting of CO and $CO_2$.

The nitrogen gas produced according to the invention will then be capable of being concerned with very varied treatments ranging, for example, from the treatments of ferrous metals (for example operations of steel annealing, sintering, tempering, heating before quenching, case hardening, carbonitriding, etc.), of nonferrous metals (for example annealing of copper, nickel, their alloys, sintering etc.), operations of glass/metal sealing, welding or brazing (involving hard brazing or else soft brazing as in microelectronics), or processes for metallizing substrates.

The invention also relates to a plant for generating a nitrogen-based gas, including in succession along a main gas conduit:

a source of impure nitrogen under pressure (in which the residual oxygen concentration is advantageously lower than or equal to 5% by volume and preferably between 0.1% and 3% by volume, but more preferably between 0.5 and 2%);

a catalytic deoxygenation reactor;

a device for purifying from all or part of the water vapor present in a gas, including at least one means for cooling a gas and at least one means for extracting all or part of the liquid water phase present in a gas;

and a secondary gas line connected in its upstream part to a source of secondary gas comprising at least one of the reducing gases from the group consisting of hydrogen and hydrocarbons and, in its downstream part, to the main conduit, at a point situated upstream of the catalytic reactor;

wherein the part of the main conduit situated upstream of the point of the main conduit where the secondary gas line is connected and downstream of the source of impure nitrogen is devoid of any flow control device.

According to one of the embodiments of the invention the plant includes at least two means of extraction, between which an intermediate means of cooling is arranged.

According to one of the embodiments of the invention the plant includes a buffer capacity situated downstream of the point of the main conduit where the secondary gas line is connected, in one of the following two positions: downstream of the purification device or at a point situated upstream of the catalytic reactor.

Figure 1:
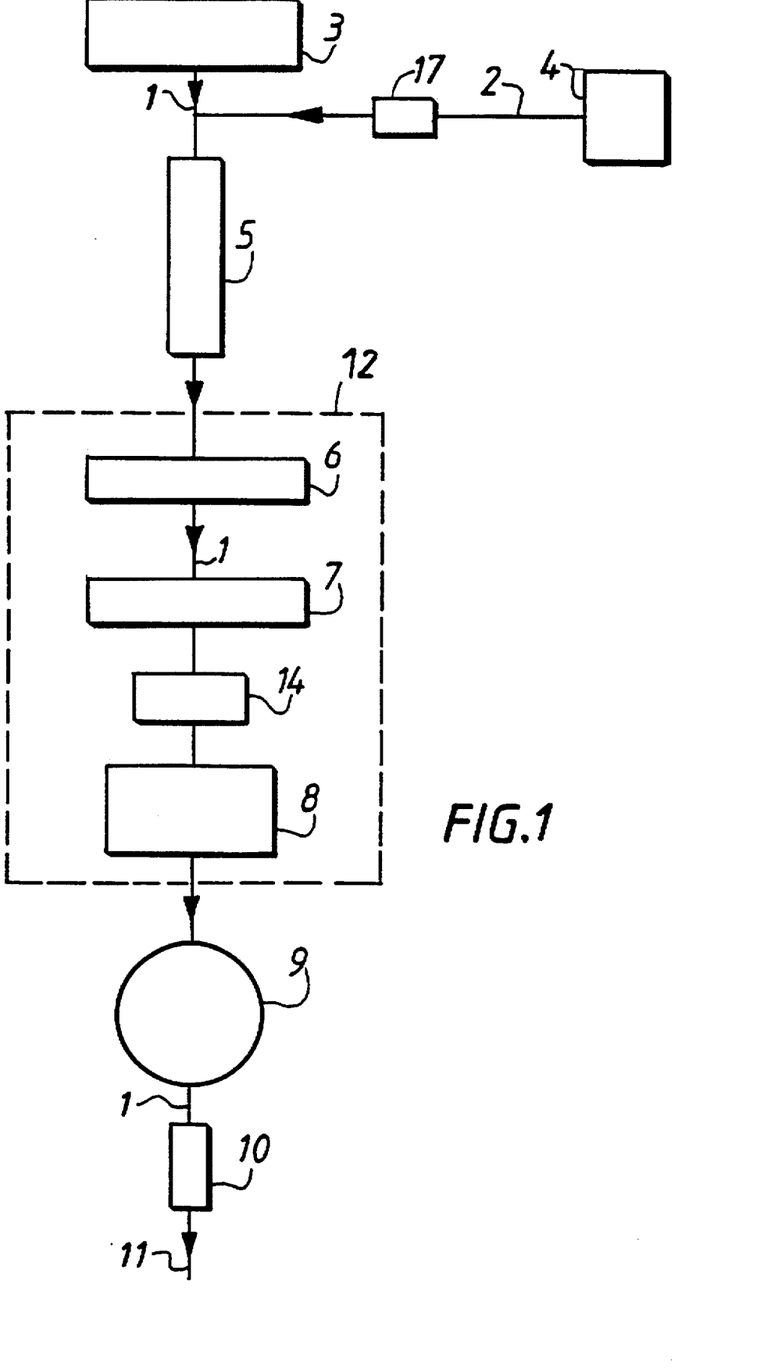
FIG. 1 is a diagrammatic representation of a plant suitable for making use of the process according to the invention.

In FIG. 1, along a main conduit line 1, there can be recognized the presence of an air separator 3 using adsorption or permeation, producing an impure nitrogen in which the residual oxygen content is in this case lower than or equal to 5% by volume, at a pressure close to $11 \times 10^5$ Pa, which is directed along the conduit 1 towards a catalytic deoxygenation reactor 5 (for example of the palladium on alumina type). Before this impure nitrogen reaches the reactor a secondary gas is added to it, by virtue of the secondary conduit 2, including, in the case of the embodiment shown, hydrogen originating from the source 4, by direct injection into the main conduit 1.

In the case of the embodiment shown the secondary conduit 2 is provided with a calibrated orifice 17.

The production conditions of the separator are present in respect of flow rate and residual oxygen purity, to take account of the specification issued by the user, but also, where appropriate, of other constraints of local economic type which may influence the dimensioning and therefore the output of the separator (for example cost of the membrane modules, cost of electricity, etc.).

For a flow rate and a given purity of the separator, the injection of secondary gas (for example pure hydrogen) will be fixed (in flow rate), bearing in mind the stoichiometry of the water formation reaction (the emphasis in practice will be to be slightly above the ratio 2 between hydrogen input and oxygen input).

As already mentioned above, such a separator operates in successive stages, filling a buffer capacity or stopping in step with the operation of the user station. The placing of the buffer capacity according to the invention ensures complete maintaining of the line under pressure, owing to the absence of means of flow control, the composition of the mixture passing through the catalytic reactor being constant (as preset). In the case of the buffer capacity configuration adopted here (downstream configuration) the flow passing through the catalytic reactor follows the production stages of the separator.

In the case of the embodiment shown in FIG. 1 the reaction gas obtained at the exit of the catalytic reactor 5, resulting from the reaction, inside the reactor, of the mixture of impure nitrogen and of secondary gas including hydrogen, then undergoes a stage of purification from its residual water vapor, symbolized by number 12 in FIG. 1.

This stage 12 includes, in fact, multiple stages symbolized 6, 7, 14, 8.

Figure 2:
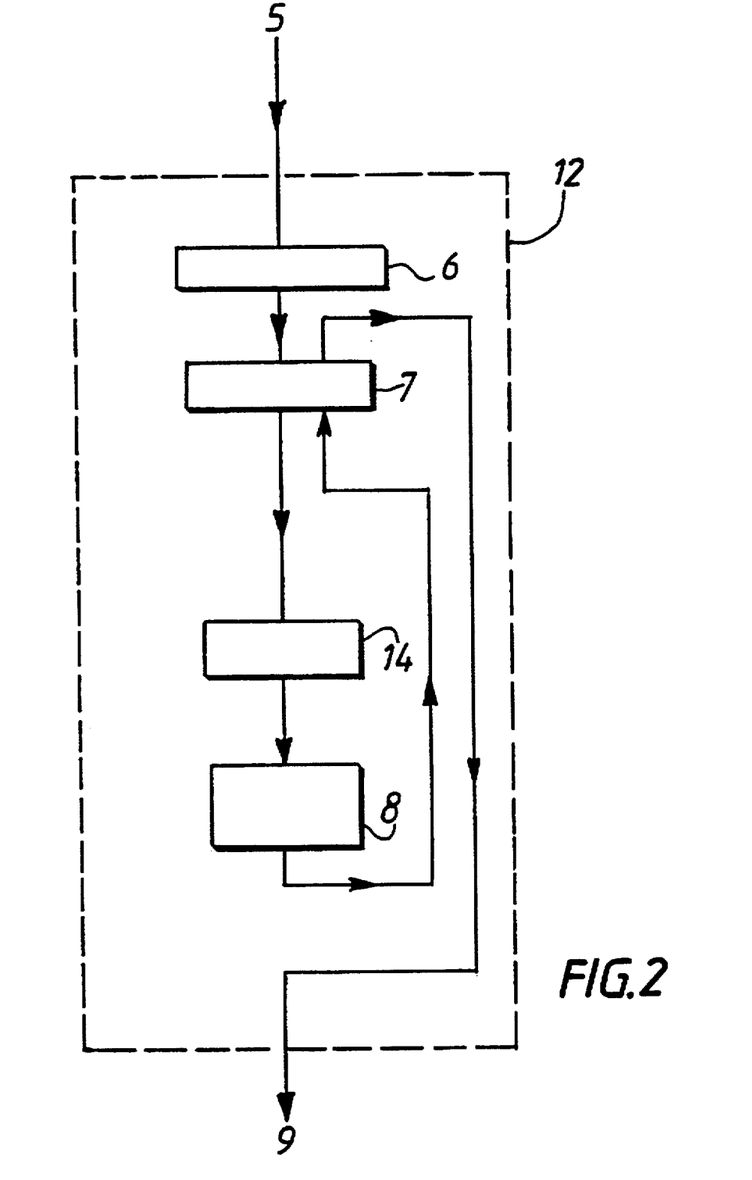
FIG. 2 is a diagrammatic view giving the detail of the stage of purification from water vapor of FIG. 1.

The first stage 6 is obtained by passing through an air cooler of the type with forced or natural convection (gas/gas exchanger), stage 7 consists of a plate exchanger (which is another gas/gas exchanger) whose operation will be detailed in the context of FIG. 2, stage 14 consists of a gas/coolant fluid (which happens to be a Freon in this case) exchanger, while stage 8, which is an extraction stage, consists in this case of an extractor for liquid water by settling and purging.

In the case of this embodiment and in the case of a considered composition of the gaseous mixture which reacts in the catalytic reactor, it is then possible to assign an order of magnitude to the temperatures reached in each stage for the gas: close to 150° C. at the reactor exit, 50° C. at the exit of cooler 6, 15° C. at the exit of cooler 7 and 3° C. at the exit of the Freon cooler 14.

Depending on the performance values sought after, it will be possible, for example, to envisage a plant such as that in FIG. 1 but reduced at elements 6 and 8 (a single cooling stage).

On leaving the purification stage 12 the purified reaction gas is then directed into a buffer capacity 9, from which the gas is regularly withdrawn according to the requirements of the user site 11 situated at the end of the line, to be expanded (10) in order to return its pressure to a pressure close to atmospheric pressure.

FIG. 2 provides the detail of the purification stage of FIG. 1, with the fact that the reaction gas obtained at the exit of extraction stage 8 will pass through the other route of the plate exchanger 7, where it can thus exchange its negative calories before reaching the buffer capacity 9.

An alternative form of embodiment of the purification stage 12 of FIG. 2 could consist of the sequence plate exchanger 7/Freon exchanger 14/extractor 8 (absence of gas-gas exchanger 6). If need be, this configuration makes it possible to preheat the gas which is sent towards the final user station. In fact, the reaction gas obtained at the exit of the extractor 8, which is directed towards one of the routes of the plate exchanger 7, encounters there the gas originating directly from the reactor 5 (instead of a gas which has been subjected to the precooling stage 6), which is therefore relatively hot. This configuration will therefore be preferentially used with a buffer capacity in an upstream position, to avoid directing this "hot" gas towards the buffer capacity 9, but rather directly towards the user station via the expansion stage.

Figure 3:
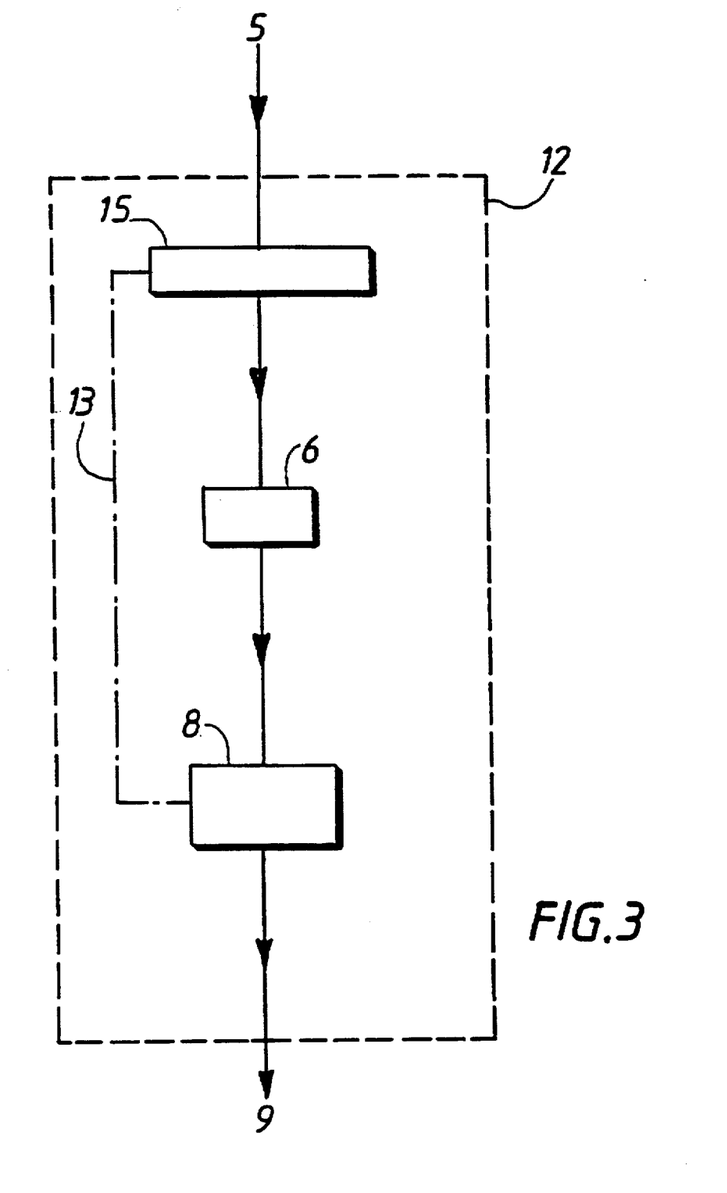
FIGS. 3, 4 and 5 illustrate other alternative forms of embodiment of the purification stage.

FIG. 3 illustrates an alternative form of embodiment of the purification stage 12 according to the invention, where the gas successively encounters a cooler of the water exchanger type 15 (for example a cooper or stainless steel loop immersed in a water trough), before encountering a cooler 6 of the type already described, and then the extractor 8.

As already mentioned, the extractor 8 has its own purger which removes the excess condensed water and in this case advantageously discharges it towards the water trough of the water exchanger 15 (recirculation symbolized by the number 13).

Figure 4:
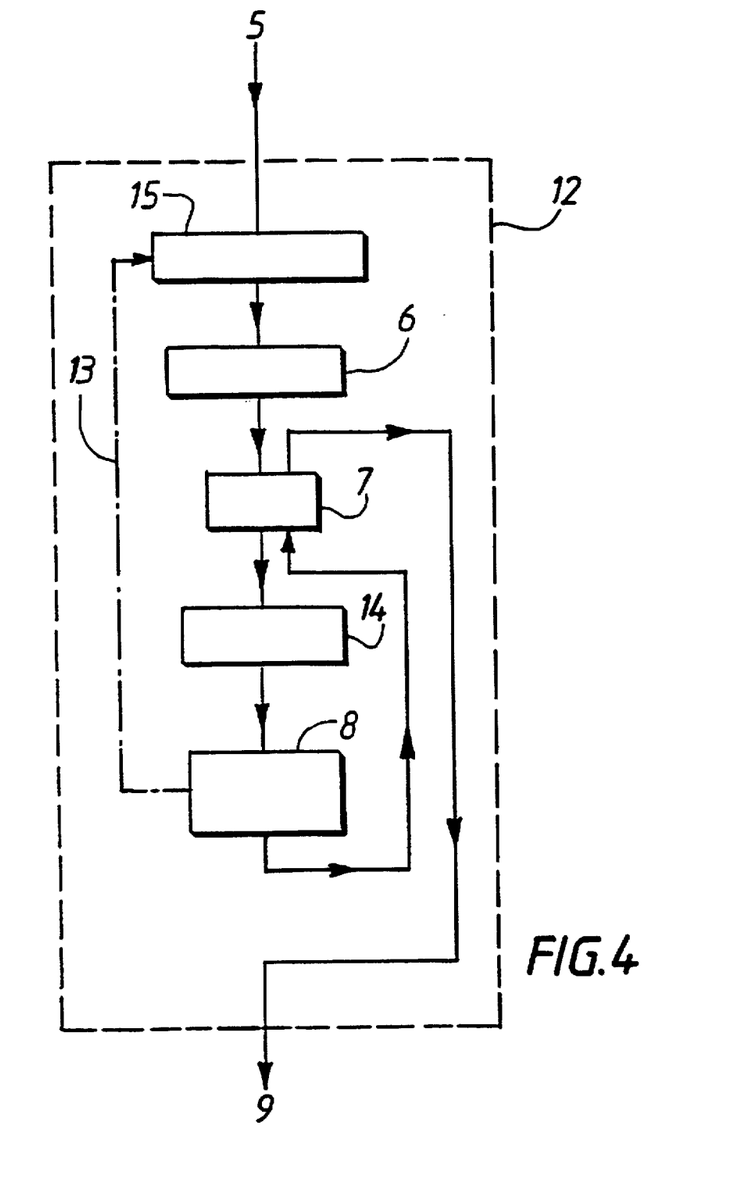

FIG. 4 illustrates another alternative form of the purification stage 12 of FIG. 1, where, before encountering the cooler 6, the reaction gas first of all comes into contact with a water exchanger 15 of the type already described. Symbolized in this figure is the passage of the reaction gas obtained at the extractor exit 8 via one of the routes of the plate exchanger 7 before being directed towards the buffer capacity. The advantageous recirculation of the liquid water extracted at the extractor 8 towards the water exchanger 15 has also been symbolized by the number 13.

Figure 5:
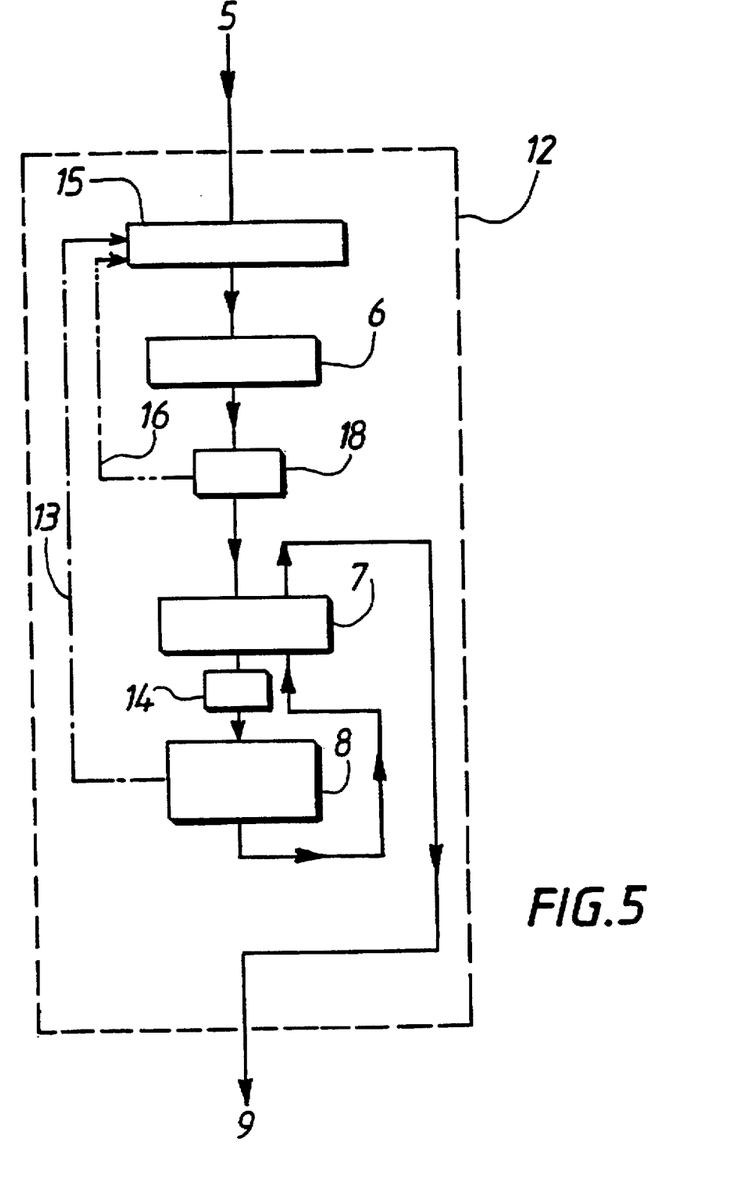

FIG. 5, for its part, illustrates the following sequence: water cooler 15/air cooler 6/an inserted extractor 18/plate cooler 7/cooler by exchange with coolant fluid 14/final extractor 8.

In addition, the advantageous recirculation 16 of the liquid water extracted at the extractor 18 towards the water exchanger 15 has therefore been symbolized here.

While all these embodiments illustrate the capacity placed downstream of the extractor, as noted above, this capacity could also advantageously be situated between the point of the conduit where the mixing is performed and the catalytic reactor 5.

A plant as described in the context of FIG. 1 was employed for producing an example of embodiment of the invention.

A generator of impure nitrogen 3 of the membrane type was employed, supplying a residual oxygen concentration of 1% by volume, at a working pressure of $11 \times 10^5$ Pa absolute and at a temperature close to 40° C.

This generator supplies in turn 0 m³/h (stoppage stage) or 100% of the nominal flow D1 (production stage) of the generator of nitrogen controlled at 1% of residual oxygen.

Furthermore, a source of secondary gas 4 was employed, which is pure hydrogen, flowing in the secondary hydrogen conduit at $15 \times 10^5$ Pa absolute and at ambient temperature. Bearing in mind the stoichiometry conditions of the reaction, the flow of hydrogen reaching the main conduit is 2.4% of the nominal flow rate $D_1$ (when the separator is in operation, otherwise 0 m³/h). This is therefore in this case a hydrogen flow rate which is very slightly higher than the minimum flow rate necessary for conforming to the stoichiometry of the reaction.

Inside the catalytic reactor 5 the reaction $H_2 + \frac{1}{2} O_2 \rightarrow H_2O$ is initiated without external heat input, but is exothermic, giving rise to the production of a reaction gas whose temperature is close to 150° C. in this case.

The other characteristics of the reaction gas obtained at the reactor exit are the following:

less than 20 ppm of residual oxygen;
0.4% of residual hydrogen;
2% of residual $H_2O$;
the pressure of the gas being $P = 11 \times 10^5$ Pa.

The flow rate obtained in this case is 0 m³/h or 101.4% of the nominal flow rate $D_1$.

At the exit of the air cooler 6 the characteristics of the reaction gas are the following:

gas = $N_2 + 1.1\%$ $H_2O + 0.4\%$ of hydrogen + condensed liquid water;
$P = 11 \times 10^5$ Pa;
temperature $T = 50°$ C.;
flow rate = 0 or 100.5% $D_1$.

The gas which leaves the cooler 6 then enters a settler/purger (not shown FIG. 1, which allows the liquid phase to be ejected) which it leaves again in order then to enter a plate exchanger 7. The characteristics of the gas leaving this plate exchanger are then the following:

gas = $N_2 + 1100$ ppm $H_2O + 0.4\%$ of hydrogen + condensed liquid water;
$P = 11 \times 10^5$ Pa;
$T = 15°$ C.;
flow rate = 0 or 99.5% of $D_1$.

The reaction gas has therefore been cooled in the plate exchanger to a temperature below 50° C. (which in this case happens to be close to 15° C.); it can then enter the Freon cooler 14 in which it gives up its negative calories to the Freon, which goes round in a closed circuit at approximately 3° C.

The characteristics of the reaction gas obtained at the exit of the Freon cooler 14 are then the following:

gas = $N_2 + 700$ ppm $H_2O + 0.4\%$ of hydrogen + condensed liquid water;
$P = 11 \times 10^5$ Pa;
$T = 3°$ C.;
flow rate = 0 or 99.5% of $D_1$.

On leaving the Freon cooler the reaction gas discards its liquid phase in the extractor/purger 8.

By way of illustration it should be stated that, had all the cooling stages been carried out not at pressure but at atmospheric pressure (by expanding the gas to atmospheric pressure before it arrives at the first cooling stage), a water vapor content of 7600 ppm would have been obtained (instead of 700 as in the case in the example illustrated).

The cold gas at 3° C. obtained at the extractor exit can optionally serve as coolant fluid in one of the routes of the plate exchanger, where it is reheated to ambient temperature.

Directly on leaving the extractor, or while passing through one of the routes of the plate exchanger, depending on the circumstances, the reaction gas is then allowed to enter, still under pressure, the buffer capacity 9, where its characteristics are those which it had on leaving the extractor, except for its temperature which is in this case close to 30° C. (that is to say the ambient temperature of the plant shop).

Depending on the requirements of the final user station, gas is regularly withdrawn from the buffer capacity, in order to pass through an expander and a device for controlling the user flow rate, before reaching the user station 11 consisting, for example, of a heat treatment furnace.

The characteristics of the purified gas which arrives at such a heat treatment furnace are then for the described embodiment, as follows:

gas = $N_2 + 700$ ppm $H_2O + 0.4\%$ of hydrogen;
$P = 1 \times 10^5$ Pa absolute;
$T$ = the ambient temperature;
flow rate = the continuous or instantaneous flow rate of the user = d% of $D_1$.

Furthermore, the operation of the buffer capacity (as a lung) is well known and will not be detailed here again (when the pressure in the buffer capacity falls below a low limit threshold the separator comes back into service, while the separator is stopped when this pressure moves above a high limit threshold).

Thus, if, for example, $D_1$ is a 100 base and the user's flow rate relative to this 100 base is equal to 70, then the generator will operate 70% of the time at its nominal value $D_1$ and 30% of the time at its value 0.

It will be noted that the user's flow rate must in all cases be lower than or equal to the nominal flow rate $D_1$ of the nitrogen generator; consequently, in order to guard against possible problems of consumption being exceeded, it is possible either to place an alarm linked to a minimum pressure threshold in the buffer capacity or to install an overspill at the entry of the buffer capacity and thus to control a minimum pressure upstream of the overspill.

Although the present invention has been described in relation to particular embodiments, it is not, however, limited thereby, but is, on the contrary, capable of modifications and alternative forms which will be apparent to a person skilled in the art.

What is claimed is:

1. A plant for generating a nitrogen-based gas, said plant comprising:

(a) a source of impure nitrogen under pressure containing a residual oxygen concentration;

(b) a main gas conduit connected at one end thereof to said source;

(c) a catalytic deoxygenation reactor connected to another end of said main gas conduit;

(d) a secondary gas line connected to a source of a secondary reducing gas at one end thereof and to said main gas conduit at a point situated upstream of the catalytic deoxygenation reactor at another end thereof; and (e) a device for removing water vapor present in a gas, said device being in communication with said catalytic deoxygenation reactor and comprising at least one means for cooling the gas and at least one means for extracting a liquid water phase from the gas, and wherein the main gas conduit between the source of impure nitrogen and the point where the secondary gas line is connected is devoid of any flow control device.

2. The plant according to claim 1, wherein said device comprises a means for cooling the gas disposed between at least two means for extracting the liquid water phase.

3. The plant according to claim 1, further comprising a buffer capacity situated (A) downstream of said device or (B) between said point on the main conduit where the secondary gas line is connected and the catalytic deoxygenation reactor.

4. The plant according to claim 1, wherein said at least one means for cooling the gas is a gas/gas exchanger, a gas/liquid exchanger, or a gas/coolant fluid exchanger.

5. The plant according to claim 3, wherein said device comprises a plate exchanger, a gas/coolant fluid exchanger, and a means for extracting the liquid water phase present in the gas.

6. The plant according to claim 1, wherein said secondary gas line comprises a calibrated orifice.

7. A plant for generating a nitrogen-based gas, said plant comprising:

(a) an air separator for providing a source of impure nitrogen under pressure containing a residual oxygen concentration;

(b) a main gas conduit connected at one end thereof to said air separator;

(c) a catalytic deoxygenation reactor connected to another end of said main gas conduit;

(d) a secondary gas line connected to a source of a secondary reducing gas at one end thereof and to said main gas conduit at a point situated upstream of the catalytic deoxygenation reactor at another end thereof; and (e) a device for removing water vapor present in a gas, said device being in communication with said catalytic deoxygenation reactor and comprising at least one means for cooling the gas and at least one means for extracting a liquid water phase from the gas, and wherein the main gas conduit between the air separator and the point where the secondary gas line is connected is devoid of any flow control device.

8. A plant for generating a nitrogen-based gas, said plant comprising:

(a) an air separator for providing a source of impure nitrogen under pressure containing a residual oxygen concentration;

(b) a main gas conduit connected at one end thereof to said air separator;

(c) a catalytic deoxygenation reactor connected to another end of said main gas conduit;

(d) a secondary gas line connected to a source of a secondary reducing gas at one end thereof and to said main gas conduit at a point situated upstream of the catalytic deoxygenation reactor at another end thereof; and (e) a device for removing water vapor present in a gas, said device being in communication with said catalytic deoxygenation reactor and comprising at least one means for cooling the gas and at least one means for extracting a liquid water phase from the gas, wherein the main gas conduit between the air separator and the point where the secondary gas line is connected is devoid of any flow control device, and wherein said plant further comprises a buffer capacity situated (A) downstream of said device or (B) between said point on the main conduit where the secondary gas line is connected and the catalytic deoxygenation reactor.

* * * * *